United States Patent [19]

Ruch et al.

[11] 4,421,322
[45] Dec. 20, 1983

[54] COMBINATION KNIFE-EDGE AND AREAL CONTACT LIP SEAL FOR MOVABLE ELECTRODES

[75] Inventors: Jean Ruch, Brilon; Josef Nelles, Meschede, both of Fed. Rep. of Germany

[73] Assignee: Accumulatorenwerke Hoppecke Carl Zoellner & Sohn GmbH & Co. KG, Brilon, Fed. Rep. of Germany

[21] Appl. No.: 294,697

[22] Filed: Aug. 20, 1981

[30] Foreign Application Priority Data

Aug. 28, 1980 [DE] Fed. Rep. of Germany ....... 3032445

[51] Int. Cl.³ .............................................. F16J 15/06
[52] U.S. Cl. ..................................... 277/12; 277/178; 277/186; 277/207 R; 277/212 R
[58] Field of Search ................... 277/12, 32, 138, 165, 277/178, 181–186, 200, 205, 206 R, 206 A, 207 R, 207 A, 215, 212 R, 212 C, 212 F, 212 FB

[56] References Cited

U.S. PATENT DOCUMENTS

| 2,487,669 | 11/1949 | Pattullo et al. | 277/207 X |
|---|---|---|---|
| 2,558,183 | 6/1951 | Kosatka | 277/207 X |
| 2,561,884 | 7/1951 | Perrow | 277/207 A X |
| 2,897,533 | 8/1959 | Bull et al. | 277/207 X |
| 3,379,444 | 4/1968 | Brummer et al. | 277/207 X |
| 3,430,989 | 3/1969 | Wendt | 277/207 A X |
| 3,480,286 | 11/1969 | Kosatka | 277/182 |
| 4,304,416 | 12/1981 | Oshima | 277/165 X |
| 4,311,317 | 1/1982 | Bartels | 277/207 A X |

FOREIGN PATENT DOCUMENTS

| 1643777 | 8/1952 | Fed. Rep. of Germany . | |
|---|---|---|---|
| 922317 | 1/1955 | Fed. Rep. of Germany | 277/181 |
| 1240347 | 5/1967 | Fed. Rep. of Germany | 277/207 A |
| 1981067 | 3/1968 | Fed. Rep. of Germany . | |
| 2314770 | 11/1973 | Fed. Rep. of Germany . | |
| 2340644 | 2/1974 | Fed. Rep. of Germany | 277/207 A |
| 2706016 | 8/1978 | Fed. Rep. of Germany . | |
| 2607519 | 9/1978 | Fed. Rep. of Germany . | |
| 2850394 | 5/1979 | Fed. Rep. of Germany . | |
| 1432209 | 2/1966 | France | 277/207 A |
| 1262074 | 2/1972 | United Kingdom | 277/178 |

Primary Examiner—Robert S. Ward, Jr.
Attorney, Agent, or Firm—Martin A. Farber

[57] ABSTRACT

A lip seal of elastic material has at least one sealing lip having a knife-edge sealing ridge particularly for sealing an axially moving part of a device from a liquid space, for instance in a galvanic metal-air cell. In order to improve the sealing of the axially moving device part with respect to the liquid space and to lengthen the sealing action, a membrane-like protective lip is formed on the liquid side in front of the sealing ridge, the lip resting with areal contact against the device part which is to be sealed off. The membrane-like protective lip due to its inherent tension or initial tension applies itself with high unit surface pressure against the surface of the device part to be sealed off.

17 Claims, 6 Drawing Figures

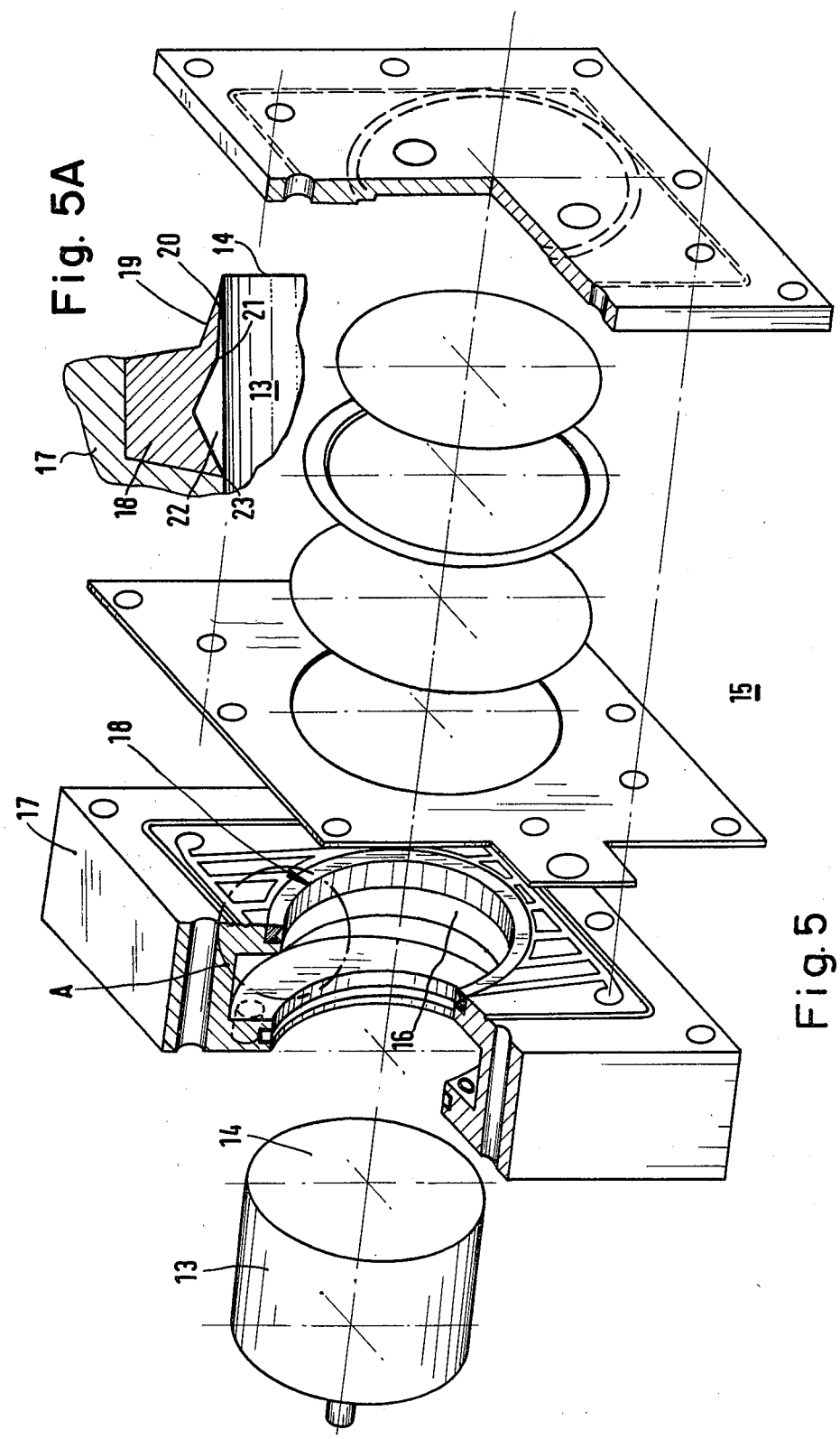

COMBINATION KNIFE-EDGE AND AREAL CONTACT LIP SEAL FOR MOVABLE ELECTRODES

The present invention relates to a lip seal of elastic material having at least one sealing lip with a knife-edge sealing ridge, intended particularly for sealing off an axially moving device part from a liquid space.

A galvanic metal-air cell represents such a case. It comprises a consumable metal electrode and an air electrode the distance between which is maintained constant in operation by advancing the metal electrode as it is consumed. Between the electrodes there is an electrolyte chamber through which electrolyte, in particular caustic potash solution, is conducted. In such a galvanic cell it is of essential importance for the consumable metal electrode to extend into the liquid chamber sealed in such a manner that its end face is the only working face. For this purpose it is known to use an elastic lip seal which has a conically extending inner surface in order to develop a sharp sealing edge with respect to the electrolyte chamber, said edge surrounding the consumable electrode tightly in lip-like manner (West German Pat. No. 26 07 519).

With the use of the known seal there is the disadvantage that the desired sealing of the liquid chamber is not assured in prolonged operation. Due to the movement of the electrolyte and local high reaction temperatures corrosion occurs in the sealing region so that the liquid can migrate under the seal. This behavior is promoted by impurities in the electrode material which may lead to sitting or defective places. Another limiting factor is the nature of the surface of the metal electrode. It is necessary to polish the surface in order to obtain a reliable seal, but the original turning grooves appear again after some time under the influence of the electrolyte. As a whole, therefore, a satisfactory operating life of the galvanic cell cannot be consistently obtained since, due to the leaks which occur, damage is caused by the electrolyte, leading to the failure of the cell.

The object of the present invention is to provide an improved lip seal of long-lasting sealing action for sealing an axially moving device or machine part from a liquid space, and preferably for a galvanic cell of the type described above. The disadvantages mentioned are to be avoided.

This object is achieved in accordance with the invention in the manner that a membrane-like protective lip (7; 19) is developed on the liquid side in front of the sealing ridge (4; 21), said lip engaging with areal contact against the machine part (13) which is to be sealed off. The protective lip is preferably in one-piece with the lip seal and due to its inherent tension stress or initial tension (stress or biasing) fits with high unit surface pressure against the surface of the device or machine part which is to be sealed off. The excellent results obtained with this seal—namely, up to now there has been no failure of a galvanic cell over the entire life of the consumable electrode—are due to the fact that the protective lip does not permit the decisive corrosion influences to act. Thus, for instance, the effect of the movement of the electrolyte on the sealing region is practically entirely prevented. The rate of corrosion itself is decisively reduced by the electrolyte, due to the fact that an extremely thin layer of electrolyte forms below the protective lip and rapidly becomes saturated with the consumable metal so that it loses its corrosiveness.

The initial tension of the protective lip can be made greater or lesser by design, by providing an undercutting which controls elasticity at the transition between the sealing ridge and the protective lip. Another possibility is afforded by selection of the direction in which the protective lip extends in the unstressed condition. The greater the angling of the protective lip in the unstressed condition as compared with its direction of extension in the installed condition, the greater the initial tension. In the preferred embodiment it is proposed to provide an undercut and to develop the direction of extension parallel to that of the sealing lip in the unstressed condition. In this case the protective lip becomes thinner in wedge shape manner in a direction towards the outside and has a projecting length of between 1/5 and 1/20 of the diameter of the machine part.

A further improvement in the sealing action is obtained in accordance with one suitable embodiment of the invention by providing a multiple sealing in series, the lip seal being developed as a double lip seal of gable-shaped (roof or V-shaped) cross section with the protective lip (19). In this way there is obtained first of all a surface (or area) sealing, with a saturation space (20), at the protective lip, then a line (but circumferentially) sealing along the sealing ridge (21) of the first sealing lip, then another saturation space (22) within the gable cross-section and finally another line (but circumferentially) seal along the sealing ridge (23) of the second sealing lip. By this embodiment the important advantage is obtained that it is possible to operate even with electrode materials of reduced purity, for instance aluminum of 98% purity, and that polishing of the surface can be dispensed with. This is a substantial economic advantage.

The lip seals of the invention are normally of annular shape. However, other shapes are also possible, but it must be seen to it that equal radial application forces are established by the shape depending on the surfaces to be sealed off.

It is advantageous to form the annular flange of the lip seal, which is provided for the attachment in the housing, in the shape of an outer multiple seal with a plurality of sealing ridges arranged one behind the other. In the preferred application of the lip seal of the invention to a metal-air cell of the type mentioned above, EPTM (international designation) and namely, ethylene, propylene, Dïan copolymer is used as the material. With the above and other objects and advantages in view, the present invention will become more clearly understood in connection with the detailed description of preferred embodiments, when considered with the accompanying drawings, of which:

FIG. 5 shows a metal-air cell with lip seal in exploded perspective view partially broken away and partially in section; and FIG. 5A is a fragmentary relatively enlarged cross-section of the lip seal shown within the dot-dashed circle in FIG. 5 broken away in part and with the part to be sealed shown in side view broken away.

Figure 1:
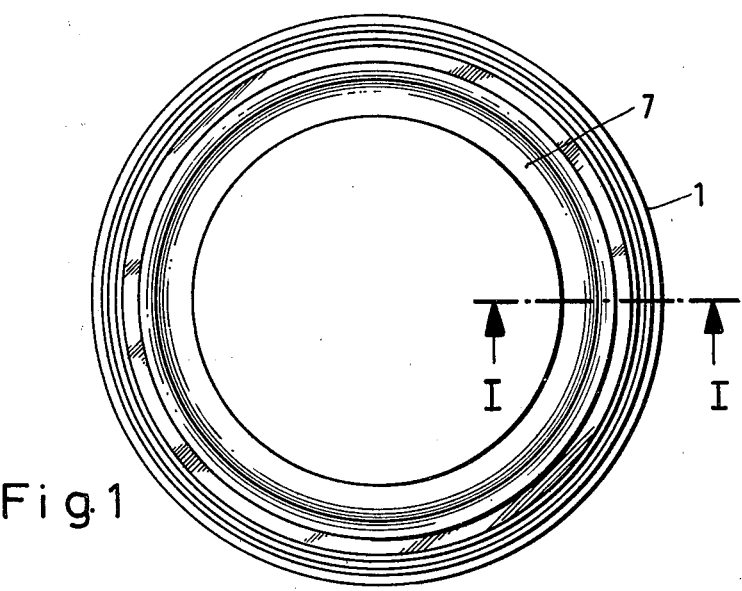
FIG. 1 is a top view of a lip seal before installation.

A lip seal 1 in accordance with the invention is made of elastic material which is developed in essentially gable-shaped cross section such that there are present two sealing lips 2,3 with knife-edge sealing ridges 4,5 on opposite sides in the ring collar 6 for positioning in a housing, not shown. In front of the sealing ridge 4 of the sealing lip 2, i.e. on the liquid side in an installed condition, a membrane-like protective lip 7 is formed integrally in one-piece with the lip seal 1. The transition from the sealing ridge 4 to the protective lip 7 is developed with an undercut (recess) 8 which facilitates the elastic bending of the protective lip 7 out of the direction of its extent shown in FIG. 2 by 90° toward the outside (that is pointing upwardly with respect to FIG. 2), with the development of an initial tension.

The protective lip then tapers in a wedge shape towards the front and in the embodiment shown has a projecting length of 1/10 of the inside diameter of the lip seal. By dashed vertical lines it is indicated that a shorter projection may also be advisable, depending on the purpose of use. The protective lip can be made duly smaller by simply cutting part of it off.

On the ring collar 6 there are provided liquid-side sealing edges 9,10 and 11 for sealing the liquid space off from the housing.

Figure 2:
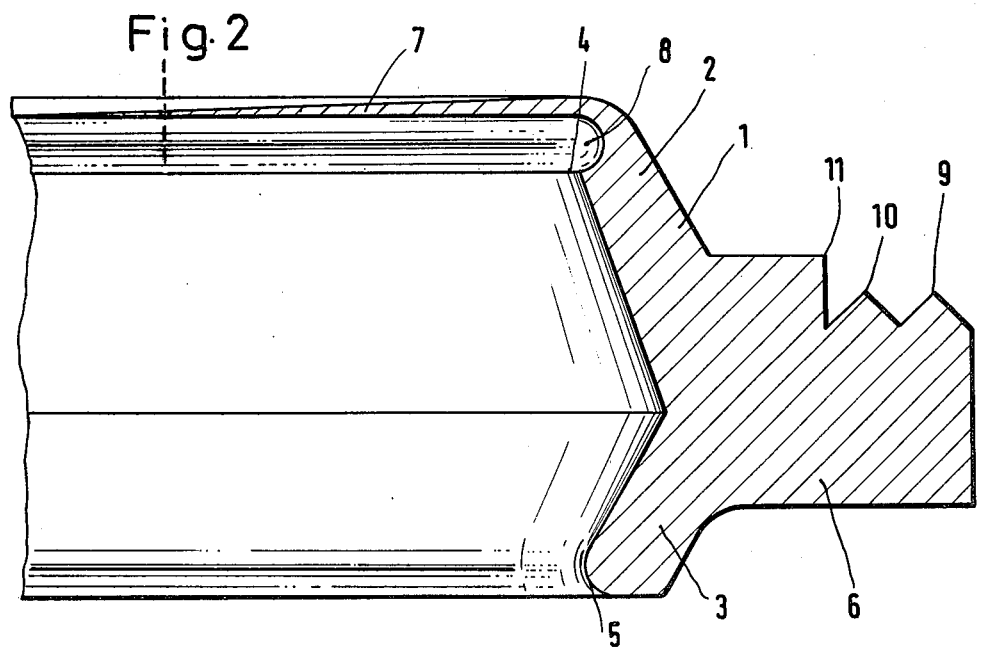
FIG. 2 is a section along the line I—I of FIG. 1 partially broken away.
Figure 3:
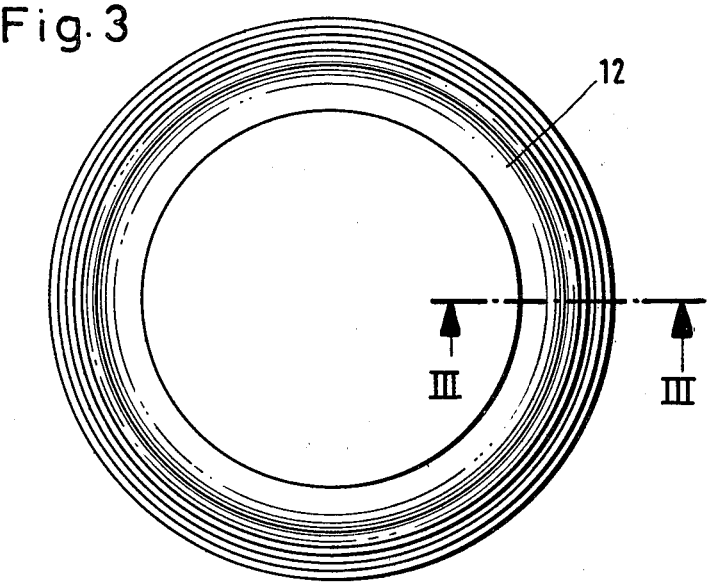
FIG. 3 shows a modified embodiment of a lip seal, seen in top view.
Figure 4:
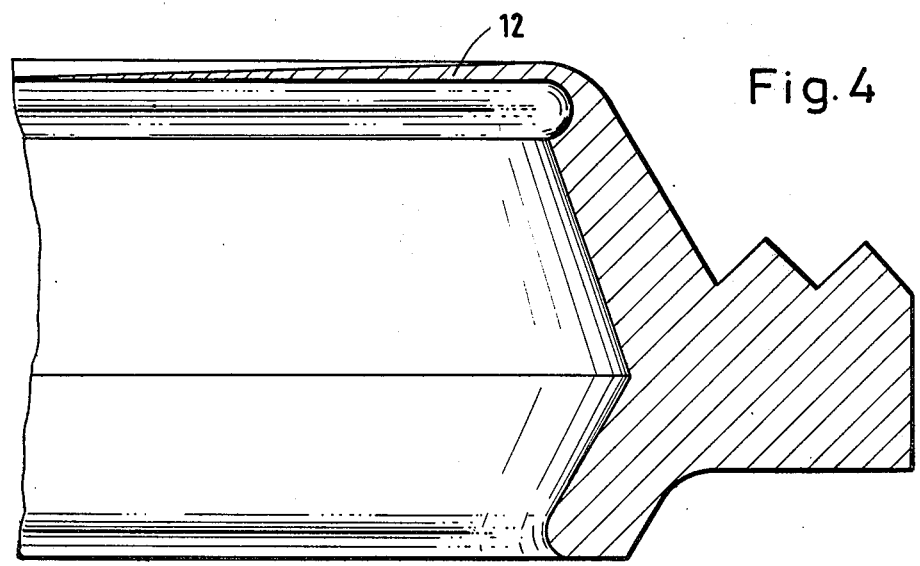
FIG. 4 is a section along the line III—III of FIG. 3 partially broken away

The modified embodiment of a lip seal shown in FIGS. 3 and 4 is in principle of identical construction as that of FIGS. 1 and 2 with the exception of the housing-side sealing edges and the dimensions selected. In the case of this lip seal, the protective lip protrudes by 1/5 of the inside diameter of the lip seal so that the region which is covered in the installed condition is larger.

FIG. 5 of the drawing shows a lip seal installed in a metal-air cell. The metal-air cell comprises essentially a cylindrically shaped consumable aluminum electrode 13 whose end surface 14 is the sole working surface, and of an air electrode 15 arranged spaced from it, with an electrolyte chamber 16 located in between. The aluminum electrode 13 is supported in feedable manner in a housing 17 within whose wall a lip seal 18 of the type described with reference to FIGS. 1 to 4 is inserted.

From the separate fragmentary FIG. 5A it can be noted that the lip seal 18 has a protective lip 19 which in its installed condition as illustrated in FIGS. 5 and 5A rests closely against the surface of the aluminum electrode 13 leaving a very shallow saturation space 20. The undercutting of the lip seal passes into and forms a first sealing ridge 21, adjoining which there are a second saturation space 22 and the second sealing ridge 23.

In this way there is obtained a multiple sealing action by sealing means of areal and linear action, leaving intermediate spaces in which there can take place an enrichment of the electrolyte by aluminum up to saturation in order to avoid more extensive corrosion. The protective lip 19, due to its sealing engagement with tension pressing against the surface of the aluminum electrode, prevents any attack or corrosion as a result of movement of the electrolyte. The protective lip adapts itself to the specific shape of the surface; despite these protective effects, easy feeding of the aluminum electrode 13 is assured. It is pointed out that this problem could not be solved, for instance, when using a stuffing box as a seal.

The metal-air cell shown operated until complete consumption of the aluminum electrode, which had a diameter of about 80 mm and a length of about 200 mm, without any impairment in the sealing effect.

We claim:

1. In a galvanic metal-air cell having a housing formed with an opening through which a movable electrode extends, the latter having a periphery and an end front surface, an electrolyte chamber being defined partly by the front surface of the electrode and being sealed by an annular lip seal of elastic material which is mounted in said housing engaging sealingly against said electrode, the improvement in said lip seal wherein the lip seal comprises
   at least one annular sealing lip with a substantially radially inwardly directed knife-like edge sealing ridge, in an installed condition in the housing, engaging against the periphery of the electrode, and
   a membrane-like protective lip extending from and in front of said sealing ridge and in the installed condition extending axially into said electrolyte chamber and pressingly engaging with areal contact against a surface area of the periphery of said electrode.

2. The lip seal according to claim 1, wherein
   said protective lip is formed integrally in one-piece with the lip seal engaging with said areal contact with high unit surface pressure against said surface area of the periphery of said electrode.

3. The lip seal according to claim 1, further comprising
   wall means defining an undercut between said protective lip and said sealing ridge defining an inner annular space therebetween.

4. The lip seal according to claim 3, wherein
   said wall means defining said undercut has a curved surface in an uninstalled condition.

5. The lip seal according to claim 3, wherein
   in the installed condition said annular space constitutes a space between said protective lip and said sealing ridge and said wall means and said periphery of said electrode between said areal contact at said surface area of said periphery of said electrode up to said knife-like edge sealing ridge, with only said protective lip at said areal contact and said knife-like sealing ridge engaging said electrode at axial ends of said space.

6. The lip seal according to claim 1, wherein
   said protective lip extends in an unstressed uninstalled condition thereof in the same direction substantially radially inwardly as that of said sealing ridge.

7. The lip seal according to claim 1, wherein
   said protective lip extends wedge-shaped becoming thinner towards the electrolyte chamber in the installed condition, and
   said protective lip has a projecting length of between 1/5 and 1/20 of the diameter of the electrode.

8. The lip seal according to claim 1 or 4, wherein
   said at least one annular sealing lip comprises a double-lip seal of annular gable-shaped cross section,
   said protective lip is formed on said double-lip seal.

9. The lip seal according to claim 8, wherein
   said double-lip seal comprises two seals formed in one-piece, at least one of said two seals constitutes said knife-like edge sealing ridge, said two seals are axially spaced from each other by means of said gable-shaped cross section defining a sealed off annular space therebetween around a portion of the periphery of said electrode in the installed condition.

10. The lip seal according to claim 1, further comprising
    means comprising an annular flange for mounting said lip seal in said housing, said annular flange is formed as an outer multiple seal with a plurality of sealing edges arranged one after the other.

11. The lip seal according to claim 6, wherein
said protective lip in the installed condition pressing against said surface area of said periphery of said electrode extends in a substantially transverse direction relative to the direction of extent of the sealing ridge.

12. The use of a lip seal of elastic material in a galvanic metal-air cell, wherein
the lip seal comprising at least one sealing lip with means comprising a knife-like edge sealing ridge in an installed condition for sealing off an axially movable part of the cell from a liquid electrolyte chamber therein at a front end surface of said part, and a membrane-like protective lip axially in front of the sealing ridge on the side of the chamber, said protective lip constitutes means for engaging with areal contact against the periphery of said part to be sealed off from said chamber,
the galvanic metal-air cell having an axially consumable metal electrode constituting said part to be sealed, and said metal electrode projects with said front end surface in said electrolyte chamber in the cell,
the lip seal sealing the consumable metal electrode off from the electrolyte chamber of the cell in such a manner that said end surface of the metal electrode is solely exposed in the electrolyte chamber constituting a sole working surface.

13. The lip seal according to claim 5, wherein
said annular space is shallow.

14. The lip seal according to claim 5, wherein
said at least one annular sealing lip comprises a double-lip seal,
said protective lip is formed on said double-lip seal,
said double-lip seal comprises two seals formed in one-piece, at last one of said two seals constitutes said knife-like edge sealing ridge, said two seals are axially spaced from each other defining a sealed off annular space therebetween around a portion of the periphery of said electrode in the installed condition,
said knife-like edge sealing ridge is between both of said annular spaces.

15. The lip seal according to claim 14, wherein
each of said two seals is a knife-like edge sealing ridge substantially radially inwardly directed engaging said periphery of said electrode.

16. The lip seal according to claim 1, wherein
said areal contact and said surface area have a substantial axial width.

17. The lip seal according to claim 1, wherein
said areal contact is adjacent a free end of said protective lip adjacent said electrolyte chamber.

* * * * *